May 12, 1931.  R. A. DOUDS  1,805,391
VALVE
Filed April 11, 1929
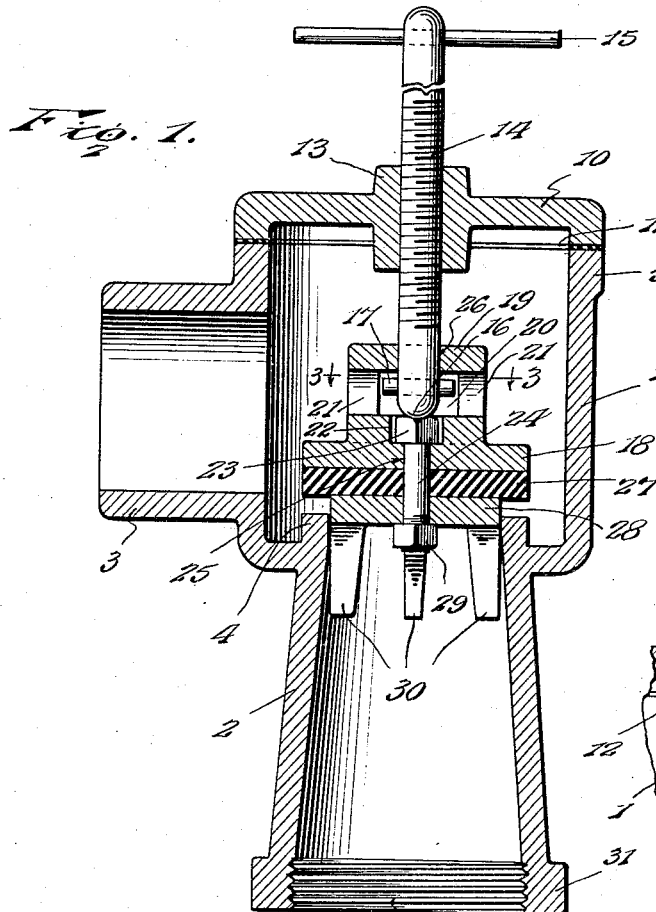
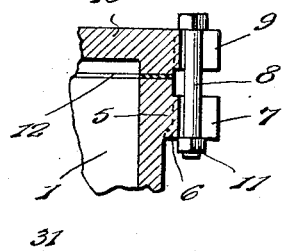
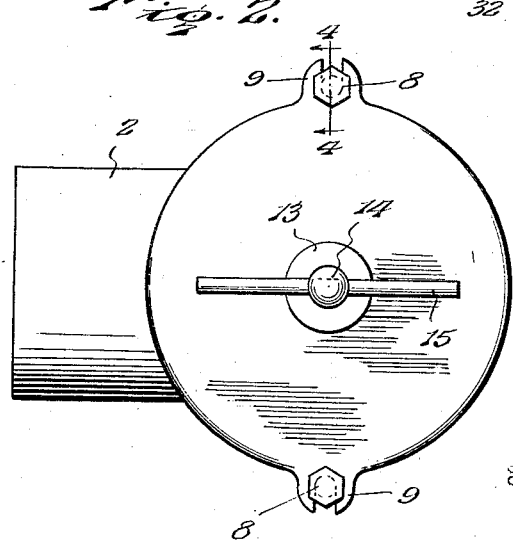
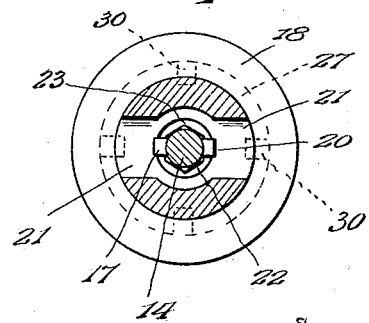
Inventor
R. A. Douds.
By Lacey & Lacey,
Attorneys Patented May 12, 1931

1,805,391

UNITED STATES PATENT OFFICE

RALPH A. DOUDS, OF LAKELAND, FLORIDA, ASSIGNOR TO WILLIAM PEACOCK AND ROBERT PEACOCK, BOTH OF LAKELAND, FLORIDA

VALVE

Application filed April 11, 1929. Serial No. 354,388.

This invention relates to water distribution and more particularly to a valve for use in irrigating pipes.

One object of the invention is to provide a valve which may be connected with pipes of an irrigating system and control flow of water from the system upon the ground and thereby allow the proper amount of moisture to be supplied to the ground and insure proper growth of fruit or vegetables.

Another object of the invention is to provide the valve with an improved type of valve head movable toward and away from a valve seat in the casing and to allow the valve head to be firmly seated without being quickly worn out.

Another object of the invention is to cause the valve stem when moved inwardly to bear against a bolt connecting a sealing disk and guide with the valve head and thereby cause wear to come against the bolt which may be formed of hard metal instead of upon the valve head which is formed of cast metal.

Another object of the invention is to allow the valve head to be easily released from the inner end portion of the valve stem in case cleaning or repairs should be necessary but prevent the valve head from accidentally becoming detached from its stem.

Another object of the invention is to provide a valve which is simple in construction and very strong and durable.

The invention is illustrated in the accompanying drawings, wherein

Figure 1 is a vertical sectional view through the improved valve.

Fig. 2 is a top plan view of the valve.

Fig. 3 is a sectional view taken transversely through the valve head on the line 3—3 of Fig. 1, and Fig. 4 is a fragmentary sectional view taken on the line 4—4 of Fig. 2.

The casing 1 of this improved valve is formed of cast metal, such as iron, and is provided with an inlet neck 2 to be connected with an irrigating pipe and an outlet neck 3 which extends from a side of the casing so that water may flow from the casing onto the ground when the valve is open. An upstanding annular valve seat 4 is formed within the casing about the inner end of the inlet neck. The valve casing is open at its upper end and above the outlet neck 3 the walls of the casing are externally thickened, as shown at 5. An arm 6 extends from each side of the casing and is slotted, as shown at 7, so that securing bolts 8 which pass through similarly slotted arms 9 extending from opposite sides of a cap or bonnet 10 may be engaged in the slots 7 and draw the bonnet downwardly when the securing nuts 11 are tightened. A sealing gasket 12 is set in place between the bonnet and walls of the casing so that, when the bolts 8 are tightened, a tight joint will be formed and leakage prevented.

The central portion of the bonnet is formed with a threaded bearing 13 and through this bearing is passed a threaded valve stem 14 formed of hard metal, such as brass, and this stem carries a turning bar or handle 15 near its upper end so that the stem may be easily rotated. The inner end portion of the stem is unthreaded and terminates in a rounded end 16, the purpose of which will be hereinafter brought out. An opening is formed transversely through the stem adjacent its inner end and through this opening is passed a securing pin 17 which retains the stem in operative engagement with a valve head 18 formed of cast iron or brass. This valve head is circular in shape, as shown in Fig. 3, and has its reduced upper portion or neck 19 formed with a pocket 20 into which the inner end portion of the valve stem extends. Side openings 21 lead from the pocket in order to allow the pin 17 to be easily inserted or removed when necessary and below the stem is formed a well 22 to receive the head 23 of a bolt 24 which passes through an opening 25 leading from the well through the lower face of the valve head. The bolt is formed of steel or other hard metal and since it is located directly beneath the stem the inner end of the stem will bear against the head of this bolt instead of against the valve head when forcing the valve head toward the valve seat to a closed position. In view of the fact that the inner end of the stem is rounded, friction will be reduced and the valve allowed to be very easily forced to a closed position. It should be noted that the opening 26 through which the stem passes into the pocket 20 is of sufficient diameter to allow the head of the bolt to pass through it and, therefore, the bolt can be easily passed downwardly into place before the valve head is applied to the valve stem and the pin 17 set in place.

A sealing disk 27 formed of rubber or a suitable composition fits against the under face of the valve head and against the sealing disk is applied a reinforcing disk 28 which tightly clamps the disk against the valve head when the securing nut 29 of the bolt which passes through both the sealing disk and reinforcing disk is tightened. The reinforcing disk is of such diameter that it may pass downwardly into the inlet and from this disk extends arms 30 which are received in the inlet and constitute guides to direct movement of the valve head toward and away from the inlet. By this arrangement movement of the valve head will be guided and the marginal portions of the sealing disk directed into proper engagement with the valve seat 4. It should also be noted that since the valve head fits loosely about the stem it will not be rotated when the stem is turned inwardly to close the valve and, therefore, wear upon the sealing disk will be reduced to a minimum and the sealing disk prevented from being quickly worn out.

When the improved valve is in use, the outlet neck is connected with a pipe of an irrigating system and the inlet neck extends downwardly so that its lower end may be connected with a pipe line. It should be noted that the lower end of the inlet neck may be formed with an outstanding rib 31 or internally threaded, as at 32, so that it may be connected with the pipe line either by a packed or threaded joint. When the valve is opened, the stem is turned outwardly and the pin 17 lifts the valve head away from the valve seat 4 until the reinforcing disk 20 moves out of the inlet and water is allowed to flow between the guiding arms 30 into the valve body and out through the outlet. In order to close the valve, the stem is rotated inwardly and its rounded inner end by bearing against the head of the bolt to force the valve head downwardly until the sealing disk is seated against the valve seat. In view of the fact that the inner end of the valve stem bears against the head of the bolt pressure exerted will come against the bolt and the valve head will be relieved from wear. If it is necessary to repair or clean the valve, the bolts 8 may be easily loosened and removed thereby releasing the bonnet and allowing this bonnet together with the valve head to be withdrawn from the valve casing. The necessary repairs or cleaning can then be performed and the valve reassembled.

Having thus described the invention, I claim:

1. A valve comprising a casing formed with an outlet and having an inlet through its bottom, a valve seat being provided about the inner end of the inlet, a bonnet at the upper end of said casing formed with a threaded opening disposed above the inlet axially thereof, a threaded stem passed through the opening in the bonnet and having a rounded inner end, a head loosely engaged about the inner end portion of said stem, a sealing disk against the under face of said head, and a fastener for said disk passed through the lower portion of said head with its upper end disposed beneath the stem whereby when the stem is turned inwardly its inner end will bear against the fastener and force the head downwardly to seat the disk against the valve seat.

2. A valve comprising a casing formed with an inlet and an outlet and having a valve seat about the inlet, a stem extending into the casing and adjustable towards and away from the inlet, a valve head loose about the inner end portion of said stem, a sealing member fitting against said head, a fastener for said sealing member passed through the lower portion of the head and through the sealing member and having a head for engagement by the inner end of said stem whereby when the stem is moved inwardly the valve head will be moved towards the inlet and the sealing member seated against the valve seat.

3. A valve comprising a casing formed with an inlet and an outlet and having a valve seat about the inlet, a stem extending into the casing and adjustable towards and away from the inlet, a valve head loose about the inner end portion of said stem, a sealing disk fitting against said head, a reinforcing member for said disk fitting against the same and having arms extending into the inlet to serve as guides, and a fastener passed through the lower portion of the valve head and through the disk and reinforcing member to secure the same together, the stem when moved inwardly being adapted to bear against the fastener and move the valve head towards the inlet and seat the disk against the valve seat.

4. A valve comprising a casing formed with an inlet and an outlet and having a valve seat about the inlet, a stem extending into the casing and adjustable towards and away from the inlet, a valve head loose about the inner end portion of said stem and formed with a pocket receiving the inner end of the stem, a pin within the pocket passed through the inner end portion of said stem to retain the valve head in engagement with the stem, said valve head having a side opening communicating with the pocket to permit insertion of the pin, a sealing disk fitting against said valve head, a facing for said disk having arms extending into the inlet to serve as guides, and a fastener passed through the lower portion of the valve head and through the sealing disk and facing and having a head at its upper end received in said pocket, the stem when moved inwardly being adapted to bear against the head of said fastener and move the valve head towards the inlet and seat the disk against the valve seat.

5. A valve comprising a casing having an inlet and an outlet, a valve seat in said casing, a stem extending into said casing and adjustable towards and away from said seat, a valve head movable towards and away from said seat, a sealing disk, and a removable fastener to secure said disk against said head constituting a removable impact member for engagement by the stem when the stem is moved to force the head and disk towards the valve seat.

6. A valve comprising a casing having an inlet and an outlet, a valve seat in said casing, a stem extending into said casing and adjustable towards and away from said seat, a valve head fitting loosely about the inner end of said stem and movable towards and away from said seat, a sealing member to bear against said valve seat, and a removable fastener to secure said sealing member against said head constituting a removable impact member for engagement by the stem when the stem is moved to force the head and disk towards the valve seat.

In testimony whereof I affix my signature.

RALPH A. DOUDS. [L. S.]